UNITED STATES PATENT OFFICE.

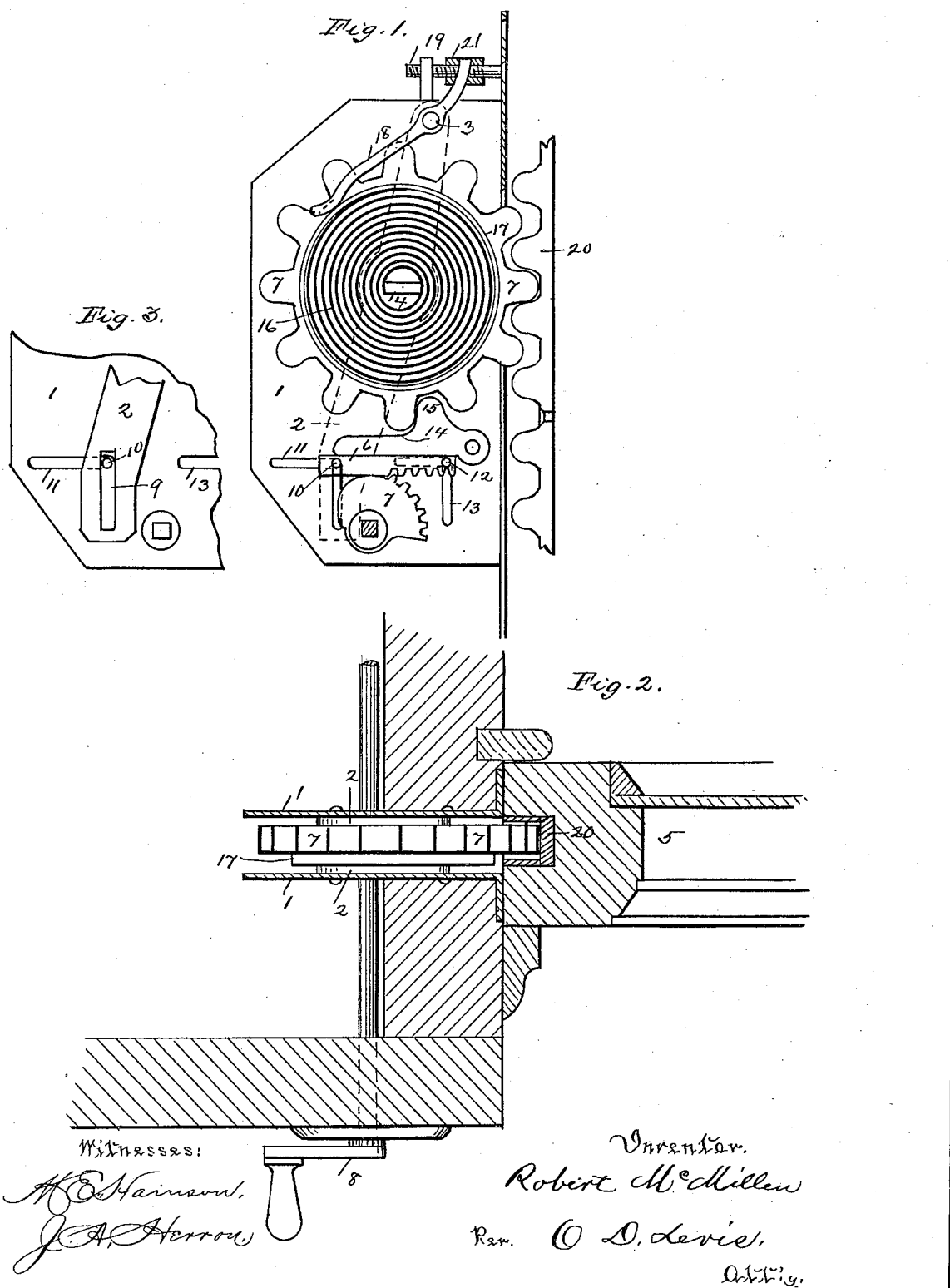

ROBERT McMILLEN, OF PITTSBURG, PENNSYLVANIA.

SASH-BALANCE.

SPECIFICATION forming part of Letters Patent No. 461,506, dated October 20, 1891.

Application filed April 13, 1891. Serial No. 388,758. (No model.)

*To all whom it may concern:*

Be it known that I, ROBERT MCMILLEN, a citizen of the United States, residing at Pittsburg, in the county of Allegheny and State of Pennsylvania, have invented certain new and useful Improvements in Sash-Balances; and I do declare the following to be a full, clear, and exact description of the invention, such as will enable others skilled in the art to which it pertains to make and use the same, reference being had to the accompanying drawings, which form a part of this specification.

My invention relates to an improved sash-balance; and it consists in a coil-spring attached to a toothed wheel adapted to mesh with a rack secured in the edge of the window-sash, a means for locking the said toothed wheel and thereby lock the sash at any position, and also a device whereby the teeth of the wheel may be disengaged from the rack to remove the sash from the frame, together with certain details of construction and combination of parts, as will be fully set forth hereinafter.

In the accompanying drawings, Figure 1 is a side elevation of my improved sash-balance having the side plate removed therefrom the better to show the interior working parts. Fig. 2 is a sectional plan view of the same, showing the balance in position in the frame of a window. Fig. 3 is an outside elevation of the frame and a portion of the slotted lever for the purpose of releasing the toothed wheel from the rack.

To construct a sash-balance in accordance with my invention I provide a frame 1 of a suitable size and form of construction, and arrange therein two levers 2, pivoted at their tops 3 and arranged parallel to each other and provided at a point near the center with a rigid bar 4. These levers are capable of being moved toward or away from the window-sash 5 by means of a ratchet-bar 6, an eccentric-toothed wheel 7, having a shaft and hand-lever 8 connected thereto. To accomplish this movement I form vertical slots 9 through the lower ends of the levers 2 and connect the same to the ratchet-bar 6 by means of pins 10, which also project through L-shaped slots 11, formed through the frame 1. At the forward end of the rack-bar 6 are also short pins 12, which project through a similar slot 13 to that formed at the rear of the frame 1 and serve as a guide for the said rack-bar. Above this rack-bar is pivoted a piece 14, having an upward extension 15 to engage with the teeth of the wheel 7 and serve as a means of locking the same. Attached to the rigid bar 4 is one end of a coil-spring 16, the other extremity of which is secured to a casing 17, secured to or formed integral with the toothed wheel 7. Pivoted to the upper end of the frame 1 is a lever 18, the lower end of which bears on the side of the wheel 7, and the pressure may be regulated by a screw 19, passing through a beveled or wedge-shaped block 21 to move the said lever sidewise and thereby form a brake to retard or reduce the force of the spring acting on the window-sash. Placed beneath the surface on each vertical edge of the window-sash are racks 20, which when engaged with the toothed wheels 7 completes the balance.

In operation two of these balances constructed as described are used to each window-sash and are placed in a mortise or opening formed at suitable points in the window-frame 21. The window-sash are fitted with the racks, as described, and the wheels moved back by means of the hand-lever 8, so as to permit the sash to enter the frame. By revolving the lever 8 to the right the eccentric permits the rack-bar 6 and the pivoted piece to move downward, thereby permitting the tension of the spring to operate the toothed wheel to place an upward pressure on the racks attached to the window-sash. This tension may be regulated by operating the screw to increase or diminish the pressure of the brake-bar on the casing surrounding and attached to the spring. To remove the sash from the window-frames the hand-lever is revolved to the left until the rack-bar and eccentric moves the toothed wheel out of mesh with the racks in the sash. To lock the window-sash at any desired point the pivoted piece 14 is engaged with the toothed wheel by means of the hand-lever, as shown at Fig. 1 on the drawings.

Having thus described my invention, I claim—

The herein-described window-sash balance, consisting of the frame 1, the levers 2, pivoted therein, and a means for moving the same toward or away from the window-sash, a suitable coil-spring, and toothed wheel mounted between the said levers, suitable racks placed in the window-sash in mesh with the said wheel, and a device whereby the wheel may be locked and thereby lock the window-sash, substantially as and for the purpose set forth.

In testimony that I claim the foregoing I hereunto affix my signature and seal this 8th day of April, A. D. 1891.

ROBERT McMILLEN. [L. S.]

In presence of—
M. E. HARRISON,
CHARLES LARGE.